United States Patent [19]
Sugiyama et al.

[11] Patent Number: 5,685,560
[45] Date of Patent: Nov. 11, 1997

[54] AIRBAG MODULE COVER ASSEMBLY

[75] Inventors: Toshiyuki Sugiyama; Hiromitsu Harada, both of Fuji, Japan

[73] Assignee: Nihon Plast Co., Ltd., Fuji, Japan

[21] Appl. No.: 588,678

[22] Filed: Jan. 19, 1996

[30] Foreign Application Priority Data

| Jan. 19, 1995 | [JP] | Japan | 7-006728 |
| Jun. 30, 1995 | [JP] | Japan | 7-166604 |
| Aug. 31, 1995 | [JP] | Japan | 7-224359 |

[51] Int. Cl.[6] ............................... B60R 21/16
[52] U.S. Cl. .................... 280/731; 280/728.3
[58] Field of Search ............... 280/728.1, 728.2, 280/728.3, 731

[56] References Cited

U.S. PATENT DOCUMENTS

| 5,002,306 | 3/1991 | Hiramitsu et al. | 280/731 |
| 5,198,629 | 3/1993 | Hayashi et al. | 200/61.54 |
| 5,265,905 | 11/1993 | Shelton | 280/731 |
| 5,338,059 | 8/1994 | Inoue et al. | 280/728.3 |
| 5,369,232 | 11/1994 | Leonelli | 200/61.54 |
| 5,371,333 | 12/1994 | Kanai et al. | 200/61.54 |
| 5,399,819 | 3/1995 | Lang et al. | 200/61.54 |
| 5,465,998 | 11/1995 | Davis | 280/731 |
| 5,563,354 | 10/1996 | Kropp | 280/731 |

FOREIGN PATENT DOCUMENTS

| 4-028170 | 3/1992 | Japan . |
| 5-008689 | 1/1993 | Japan . |

*Primary Examiner*—Kenneth R. Rice
*Attorney, Agent, or Firm*—Foley & Lardner

[57] ABSTRACT

A driver's side airbag module cover assembly including a flexible airbag module cover having an outer surface with a horn actuation area and an inner surface. The airbag module cover is formed with an easy-to-break line extending at least through the horn actuation area. A membrane type switch is mounted behind the horn actuation area and behind the easy-to-break line, extending across the easy-to-break line.

26 Claims, 17 Drawing Sheets

AIRBAG MODULE COVER ASSEMBLY

BACKGROUND OF THE INVENTION

The present invention relates to a cover assembly for a driver's side airbag module, and more specifically to a driver's side airbag module cover assembly including a membrane type switch.

Driver's side airbag module cover assemblies are well known. For example, Japanese Utility Model Application First Publication No. 4-28170 discloses a driver's side airbag module cover assembly including a flexible airbag module cover having an inner surface formed with an easy-to-break line. A membrane type switch is mounted to the inner surface of the cover without extending across the easy-to-break line. A back panel is attached to the membrane type switch such that the membrane type switch is interposed between the cover and the back panel.

Japanese Patent Application First Publication No. 5-8689 discloses a driver's side airbag module cover assembly including a box-shaped insert made of hard material and adapted to accommodate a folded inflatable cushion. A flexible cover is attached to the insert so as to cover the insert. The cover has an inner surface formed with an easy-to-break line. A membrane type switch is mounted to the insert to be disposed between the cover and the insert without extending across the easy-to-break line.

An object of the present invention is to provide a driver's side airbag module cover assembly in which a membrane type switch has an increased performance.

SUMMARY OF THE INVENTION

According to one aspect of the present invention, there is provided a driver's side airbag module cover assembly, comprising:

a flexible airbag module cover having an outer surface with a horn actuation area and an inner surface, the airbag module cover being formed with an easy-to-break line extending at least through the horn actuation area; and a membrane type switch mounted behind the horn actuation area and behind the easy-to-break line, the membrane type switch extending across the easy-to-break line.

According to another aspect of the present invention, there is provided a driver's side airbag module cover assembly, comprising:

a flexible airbag module cover having an outer surface with a horn actuation area and an inner surface; and a membrane type switch mounted behind the horn actuation area and having a tongue;

the flexible airbag module cover including a mounting structure, the mounting structure including a wall extending from the inner surface and enclosing the horn actuation area, the wall being formed with means for receiving the tongue in such a manner as to prevent concentration of stress on the tongue.

DESCRIPTION OF THE PREFERRED EMBODIMENT

Figure 1:
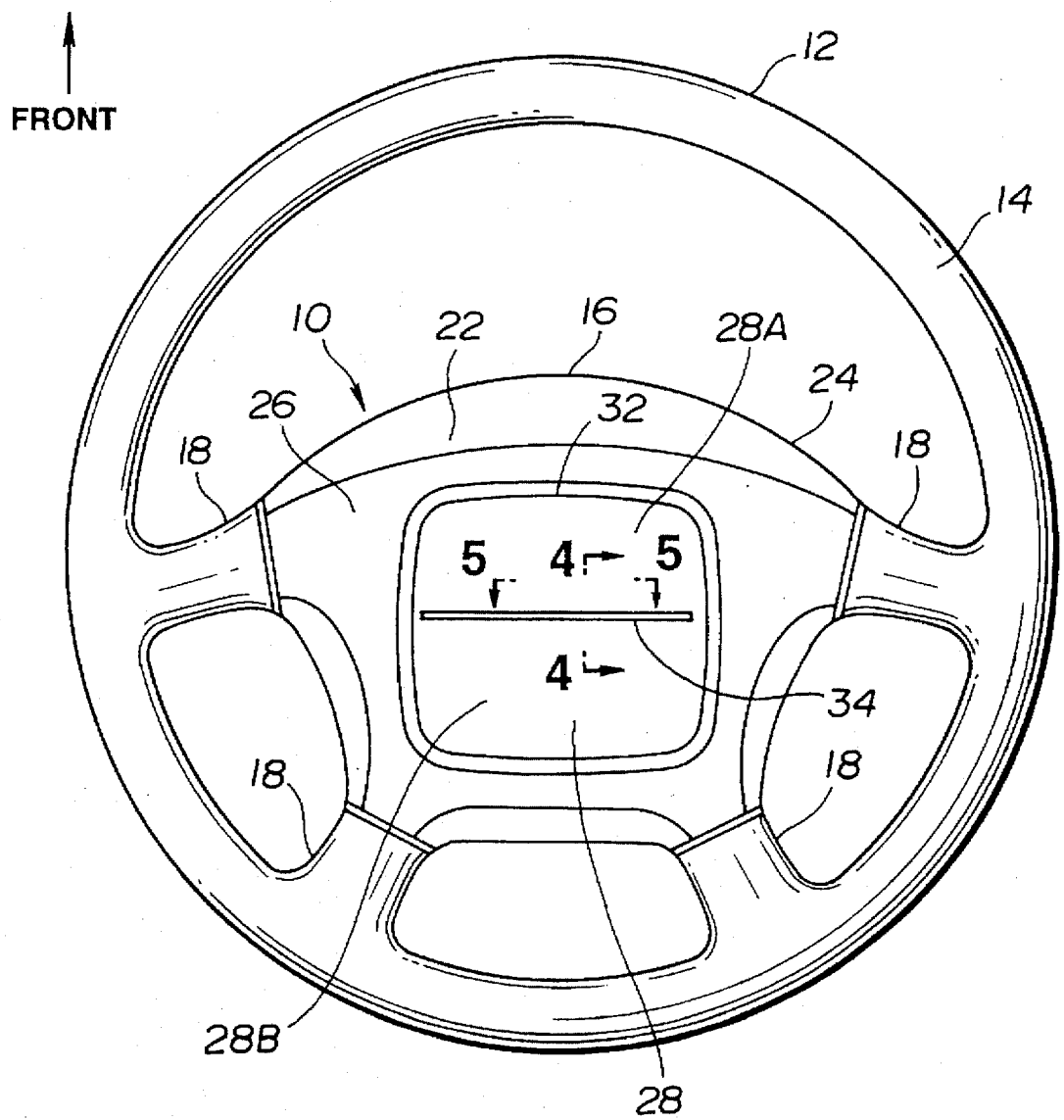
FIG. 1 is a schematic top plan view of a vehicle steering wheel on which an airbag module cover assembly according to the present invention is installed.

Referring now to FIG. 1, an airbag module cover assembly 10 according to the present invention which is disposed on a vehicle steering wheel 12.

As illustrated in FIG. 1, the steering wheel 12 includes an annular rim portion 14, a boss portion 16 disposed inside the rim portion 14, and a plurality of spoke portions 18 connecting the rim portion 14 and the boss portion 18. Disposed on upper side of the boss portion 16 are an airbag module explained later and the cover assembly 10 mounted to the airbag module.

Figure 2:
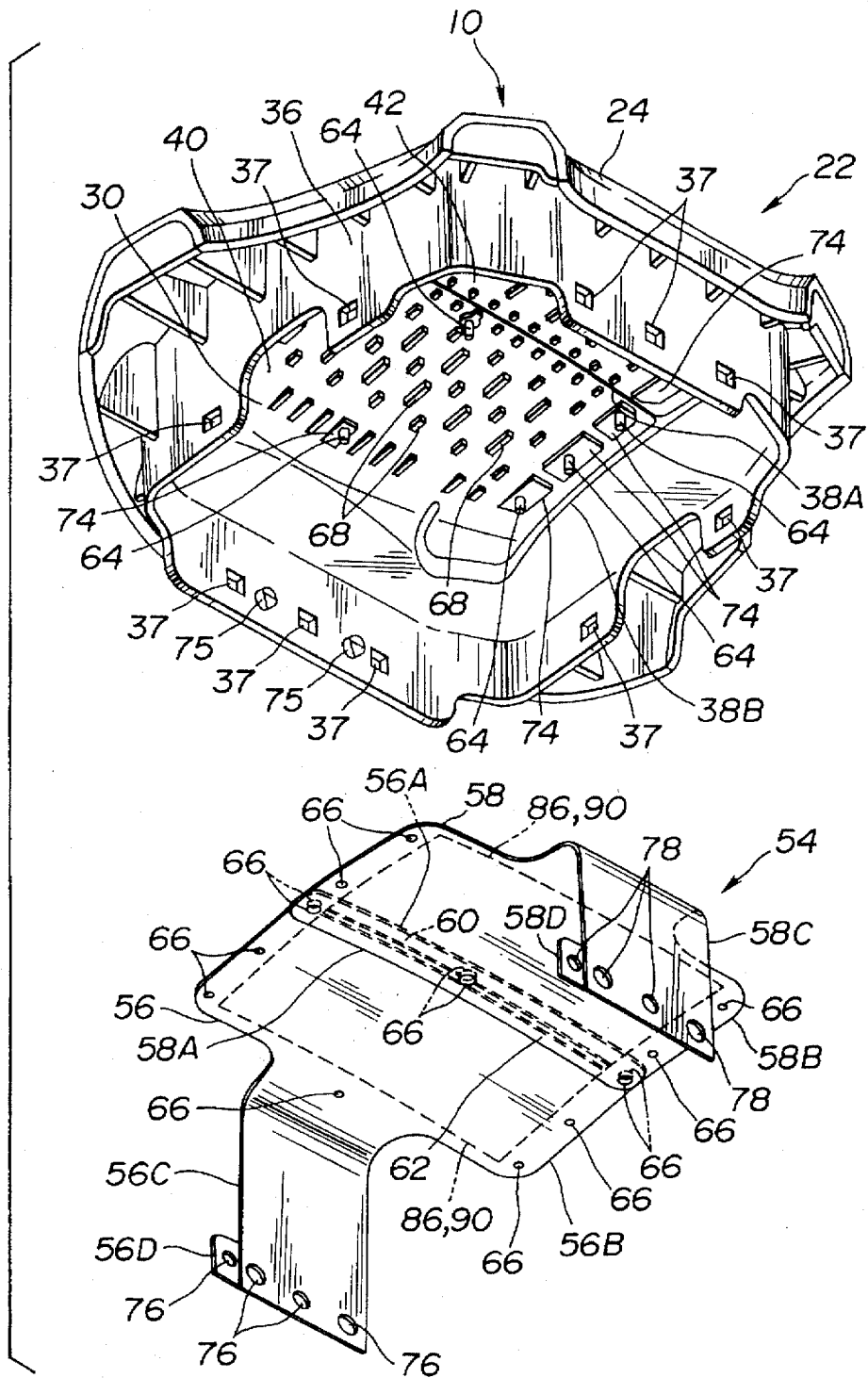
FIG. 2 is a perspective view of a first embodiment of the cover assembly, showing an airbag module cover and a membrane type switch.
Figure 4:
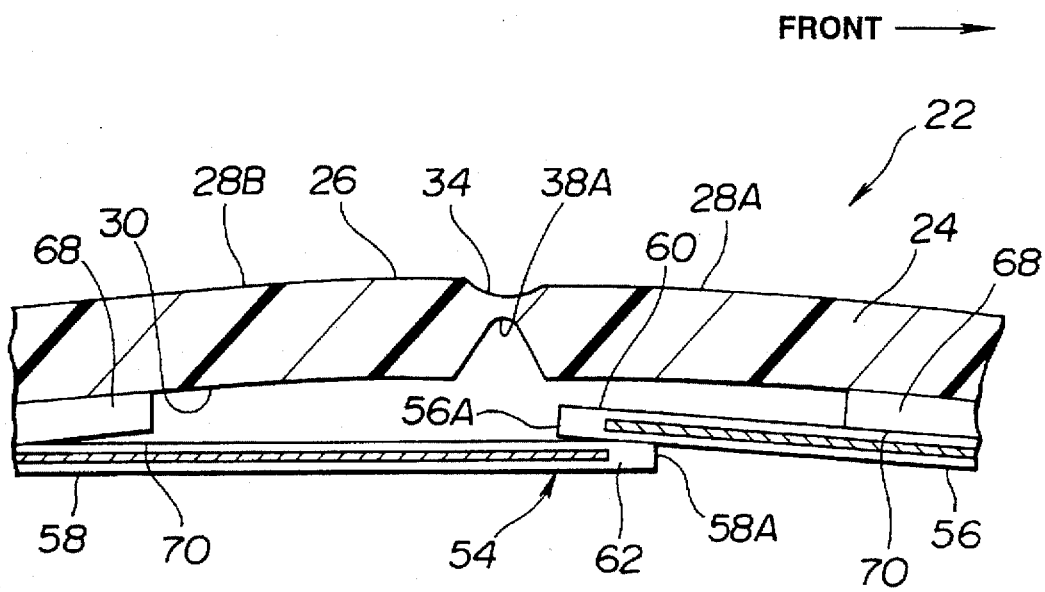
FIG. 4 is an enlarged fragmentary section taken along line 4—4 of FIG. 1.

As seen from FIGS. 1 and 2, the airbag module cover assembly 10 includes a flexible airbag module cover 22 having a generally rectangular box shape. The flexible airbag module cover 22 is made of a relatively soft synthetic resin, for instance, thermoplastic elastomer. The flexible airbag module cover 22 includes a generally rectangular upper wall 24 having an outer surface 26 with a horn actuation area 28 and an inner surface 30. The horn actuation area 28 is defined by a groove 32 formed on the outer surface 26, and resiliently deformable when pressure is applied thereto. A center groove 34 extends between right side and left side, as viewed in FIG. 1, within the horn actuation area 28 to divide the area 28 into two front and rear portions 28A and 28B. The center groove 34 acts as an outer easy-to-break line. A side wall 36 extends downward, as viewed in FIG. 2, from the inner surface 30 of the upper wall 24 to enclose the horn actuation area 28. The side wall 36 acts as a mounting portion at which the cover assembly 10 is secured to the airbag module by means of rivets. The side wall 36 has a plurality of throughholes 37 into which the rivets are inserted and staked. An easy-to-break line 38 is provided in the form of groove on the inner surface 30 of the upper wall 24 of the cover 22. The easy-to-break line 38 extends at least through the horn actuation area 28. Specifically, the easy-to-break line 38 is of a generally H shape. The H-shape easy-to-break line 38 includes a central portion 38A extending substantially corresponding to the center groove 34 as shown in FIG. 4 and through the horn actuation area 28, and two traversing portions 38B extending substantially perpendicularly from opposite ends of the central portion 38A. The traversing portions 38B respectively extend inside along the side wall 36 and have curved end portions extending toward the central portion 38A. The easy-to-break line 38 defines a pair of front and rear flap portions 40 and 42 integrally hinged to the cover 22 and forcibly separable therefrom when a folded inflatable cushion accommodated in the airbag module is deployed.

The flexible airbag module cover assembly 10 includes a membrane type switch 54 mounted behind the horn actuation area 28 and behind the easy-to-break line 38. The membrane type switch 54 extends across the easy-to-break line 38. The membrane type switch 54 includes a first membrane type switch half 56 and a second membrane type switch half 58 which are mounted behind the horn actuation area 28.

Specifically, as illustrated in FIGS. 2 and 4, the first membrane type switch half 56 is disposed behind the front portion 28A of the horn actuation area 28 and has an outer perimeter portion 56A located behind the front portion 28A. The second membrane type switch half 58 is disposed substantially behind the rear portion 28B of the horn actuation area 28 and extends across the central portion 38A of the easy-to-break line 38 to be partially behind the front portion 28A thereof. Namely, the second membrane type switch half 58 has an outer perimeter portion 58A located beyond the central portion 38A of the easy-to-break line 38 behind the front portion 28A of the horn actuation area 28. The first and second membrane type switch halves 56 and 58 have mutually mated portions 60 and 62 extending along the adjacent outer perimeter portions 58A and 56A thereof, respectively. The outer perimeter portions 56A and 58A are in the form of line segments extending between right- and left-side outer perimeter portions as shown in FIG. 2. The mutually mated portions 60 and 62 extend along the central portion 38A of the easy-to-break line 38 and are positioned thereadjacent. The mutually mated portions 60 and 62 are interconnected as follows.

The mutually mated portions 60 and 62 overlap one on another. The mutually mated portions 60 and 62 are attached to each other at an area where the mutually mated portions 60 and 62 overlap one on another by three mounting posts 64 formed integrally with the flexible airbag module cover 22. The mounting posts 64 extend from the inner surface 30 of the cover 22 toward the first and second membrane type switch halves 56 and 58. The mounting posts 64 are received in throughholes 66 formed along the outer perimeter portions 56A and 58A of the first and second membrane type switch halves 56 and 58. A plurality of mounting posts 64 are arranged in spaced relation to each other along the inside of the traversing portions 38B of the easy-to-break line 38 on the inner surface 30 of the cover 22. These mounting posts 64 are received in the throughholes 66 formed along the remainder of outer perimeters of the first and second membrane type switch halves 56 and 58. When held in place in the throughholes 66, the mounting posts 64 undergo thermal staking at their tip ends so that the first and second membrane type switch halves 56 and 58 are mounted at the outer perimeters thereof to the inner surface 30 of the cover 22.

Figure 5:
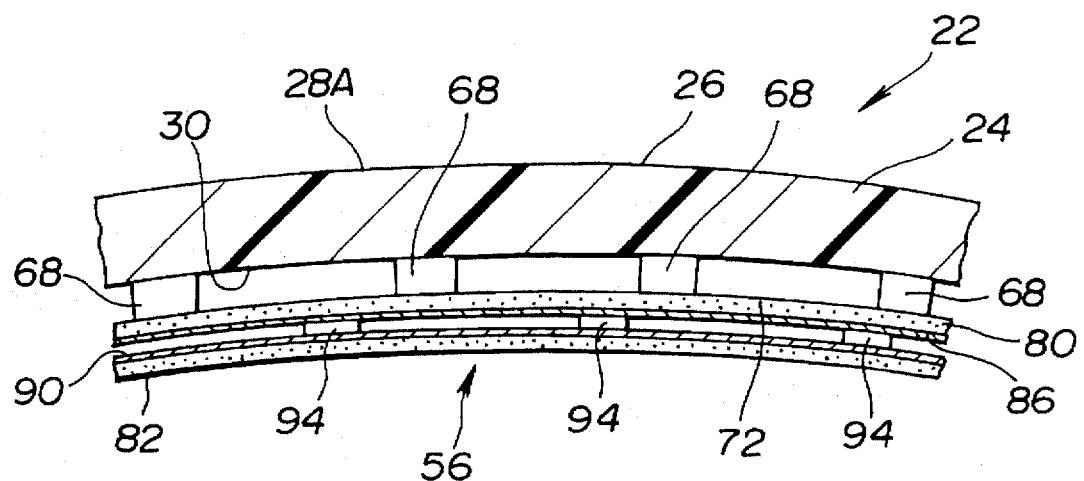
FIG. 5 is an enlarged fragmentary section taken along line 5—5 of FIG. 1.

As illustrated in FIG. 2, the flexible airbag module cover 22 is provided with a plurality of ribs 68 extending from the inner surface 30 toward the first and second membrane type switch halves 56 and 58. The ribs 68 are disposed on the front and rear flap portions 40 and 42 of the upper wall 24 of the cover 22 and spaced apart at a predetermined distance from each other. The ribs 68 are formed of a generally elongated box shape and have edges cooperating with each other to define a generally part cylindrical imaginary surface corresponding to each of the flap portions 40 and 42. The imaginary surface includes a straight line 70 shown in FIG. 4, extending in a direction of the traversing portions 38B of the easy-to-break line 38 and an arcuate line 72 shown in FIG. 5, extending in a direction of the central portion 38A thereof. Seat portions 74 of the mounting posts 64 are formed on the inner surface 30 of the cover 22 and have surfaces defining the imaginary surface in cooperation with the edges of the ribs 68. Thus, the first and second membrane type switch halves 56 and 58 extend along the edges of the plurality of ribs 68 and the surfaces of the seat portions 74. Reference numeral 75 denotes a mounting pin provided on an inner surface of the side wall 36 for temporarily mounting the first and second membrane type switch halves 56 and 58 to the side wall 36 of the cover 22.

The first and second membrane type switch halves 56 and 58 have bodies 56B and 58B of generally rectangular shape as shown in FIG. 2 and tongues 56C and 58C extending from the bodies 56B and 58B, respectively. The tongues 56C and 58C bend along the side wall 36 of the cover 22 as shown in FIG. 2. The tongues 56C and 58C have mounting portions formed with throughholes 76 and 78, respectively. The throughholes 76 and 78 of the first and second membrane type switch halves 56 and 58 and the corresponding ones of the throughholes 37 of the cover 22 receive the rivets for mounting the airbag module cover assembly 10 to the airbag module. Reference numerals 56D and 58D denote terminal portions each of which is provided with electrical terminals for electrical connection to a horn (not shown).

Figure 3:
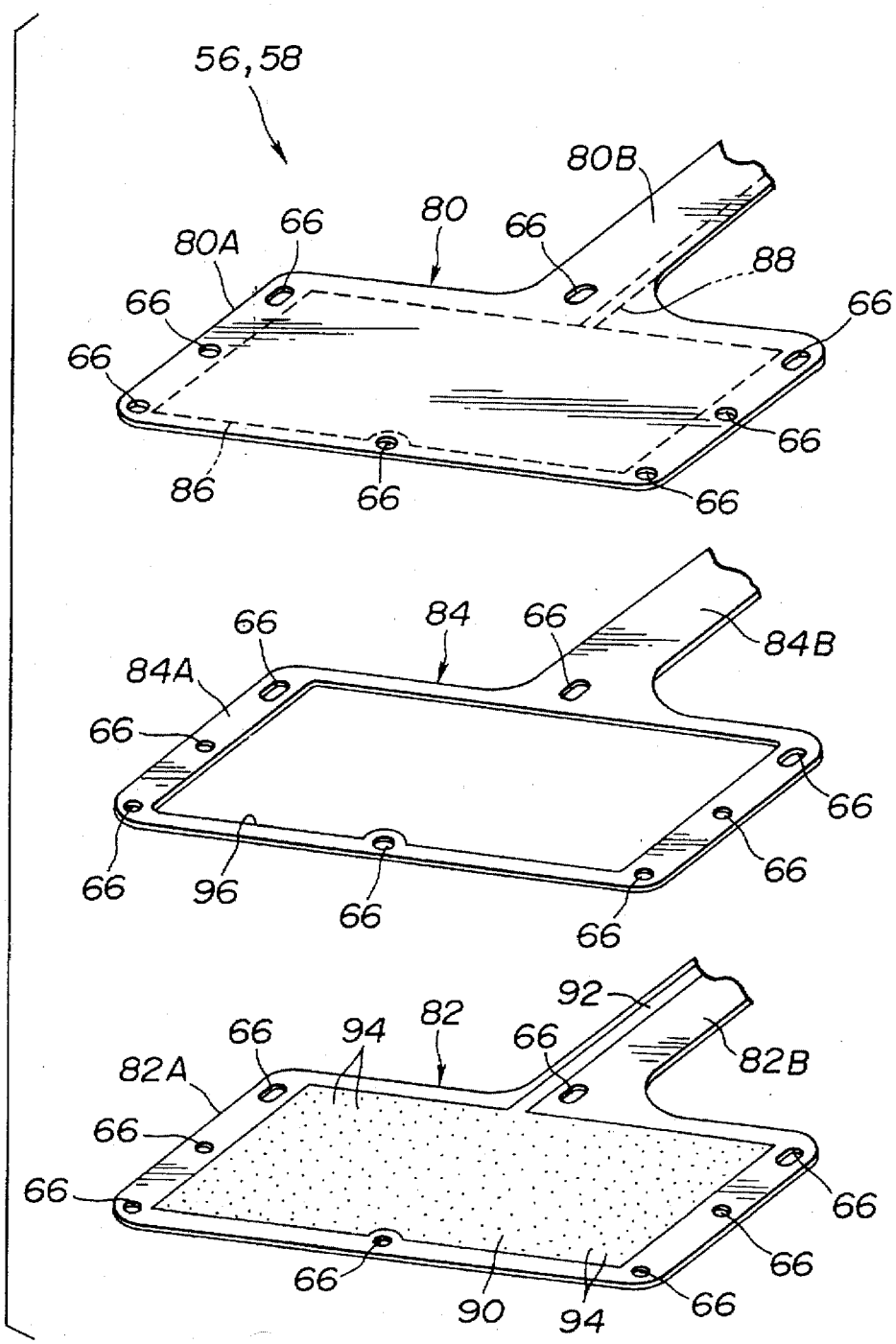
FIG. 3 is an exploded perspective view of the membrane type switch.

Specifically, each of the first and second membrane type switch halves 56 and 58 is composed of an upper plate 80, a lower plate 82, and a spacer 84 interposed therebetween, as illustrated in FIG. 3. The upper and lower plates 80 and 82 and the spacer 84 are in the form of thin flexible plate made of a suitable resin material, for instance, polyethylene terephthalate (PET). The upper and lower plates 80 and 82 and the spacer 84 have substantially the same configuration and size and include generally rectangular-shaped body portions 80A, 82A, and 84A and tongue portions 80B, 82B, and 84B extending therefrom, respectively. The upper plate 80 contains an electrical conductive coating layer 86 on a lower surface of the body portion 80A. For example, copper foil is applied to the upper plate 80 as the conductive coating layer 86 by a suitable method such as bonding. Disposed on a lower surface of the tongue portion 80B is an electrical conductive lead 88 which is formed integrally with the coating layer 86 or electrically connected therewith. The lead 88 is terminated at an edge of the tongue portion 80B to provide one of the electrical terminals disposed on the terminal portion 56D or 58D. Similarly, the lower plate 82 contains an electrical conductive coating layer 90, for instance, copper foil, applied to an upper surface of the body portion 82A, and an electrical conductive lead 92 on the tongue portion 82B. The electrical conductive lead 92 is formed integrally with or electrically connected with the coating layer 90. The lead 92 provides at its distal end, the other of the electrical terminals disposed on the terminal portion 56D or 58D. The electrical terminals are connected via wires to external electrical circuitry utilized to actuate the horn. A plurality of pellet-shaped protrusions 94 serving as spacer means and made of an elastic insulating material such as silicone rubber, are provided on the coating layer 90 of the lower plate 82. The protrusions 94 are spaced at a predetermined distance from each other and formed by a suitable method such as printing. The spacer 84 has a rectangular opening 96 at the body portion 84A which has substantially the same configuration and size as the coating layers 86 and 90 respectively provided on the upper and lower plates 80 and 82. The upper and lower plates 80 and 82 and the spacer 84 are attached together along their perimeters. In the assembled membrane type switch half 56 or 58, pressure applied to the switch half 56 or 58 causes a contact between the conductive coating layer 86 on the upper plate 80 and the conductive coating layer 90 on the lower plate 82 whereby the circuit is closed or completed to actuate the horn.

When the folded inflatable cushion of the airbag module deploys, the mutually mated portions 60 and 62 of the first and second membrane type switch halves 56 and 58 are readily removed from each other to allow smooth separation of the flap portions 40 and 42 of the upper wall 24 of the airbag module cover 22 along the easy-to-break line 38 and permit deployment of the cushion.

This arrangement of the membrane type switch 54 behind the horn actuation area 28 and behind the central portion 38A of the easy-to-break line 38 provides an increased performance of the switch. Namely, even in a case where pressure is applied to adjacent the center groove 34 in the horn actuation area 28, the membrane type switch 54 can certainly operate to actuate the horn.

Figure 6:
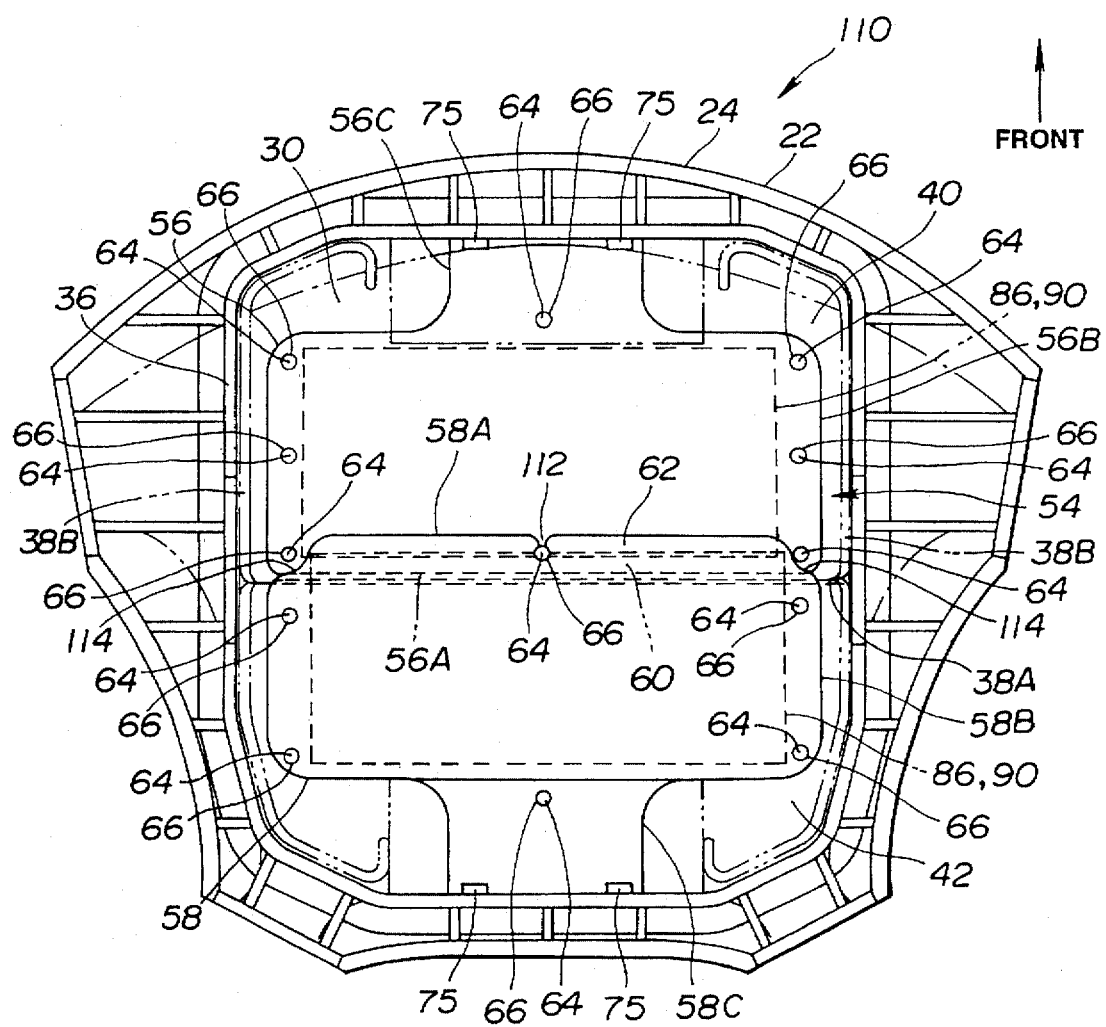
FIG. 6 is a bottom plan view of a second embodiment of the cover assembly.

FIG. 6 shows a driver's side airbag module cover assembly 110 of a second embodiment according to the present invention, which is similar to the cover assembly 10 of the first embodiment except that the second membrane type switch half 58 is provided with a groove 112 and cutout portions 114 at the outer perimeter portion 58A. Like reference numerals denote like parts and therefore detailed explanations therefor are omitted. As illustrated in FIG. 6, the groove 112 extends from the throughhole 66 formed at the mated portion 62 of the second membrane type switch half 58, to the outer perimeter portion 58A thereof. The provision of the groove 112 serves for easy disengagement of the mounting post 64 from the throughhole 66 upon deployment of the folded cushion. The cutout portions 114 are formed at opposing corners at which the mutually mated portions 60 and 62 overlapping one on another terminate. By the provision of the cutout portions 114, the mutually mated portion 62 of the second membrane type switch half 58 is attached to the mutually mated portion 60 of the first membrane type switch half 56 by only a middle one of the three mounting posts 64 disposed along the outer perimeter portion 56A. In cooperation with the groove 112, the cutout portions 114 cause an easy removal of the first and second membrane type switch halves 56 and 58 to each other, serving for quick separation of the flap portions 40 and 42 of the cover 22 upon deployment of the folded inflatable cushion.

Figure 7:
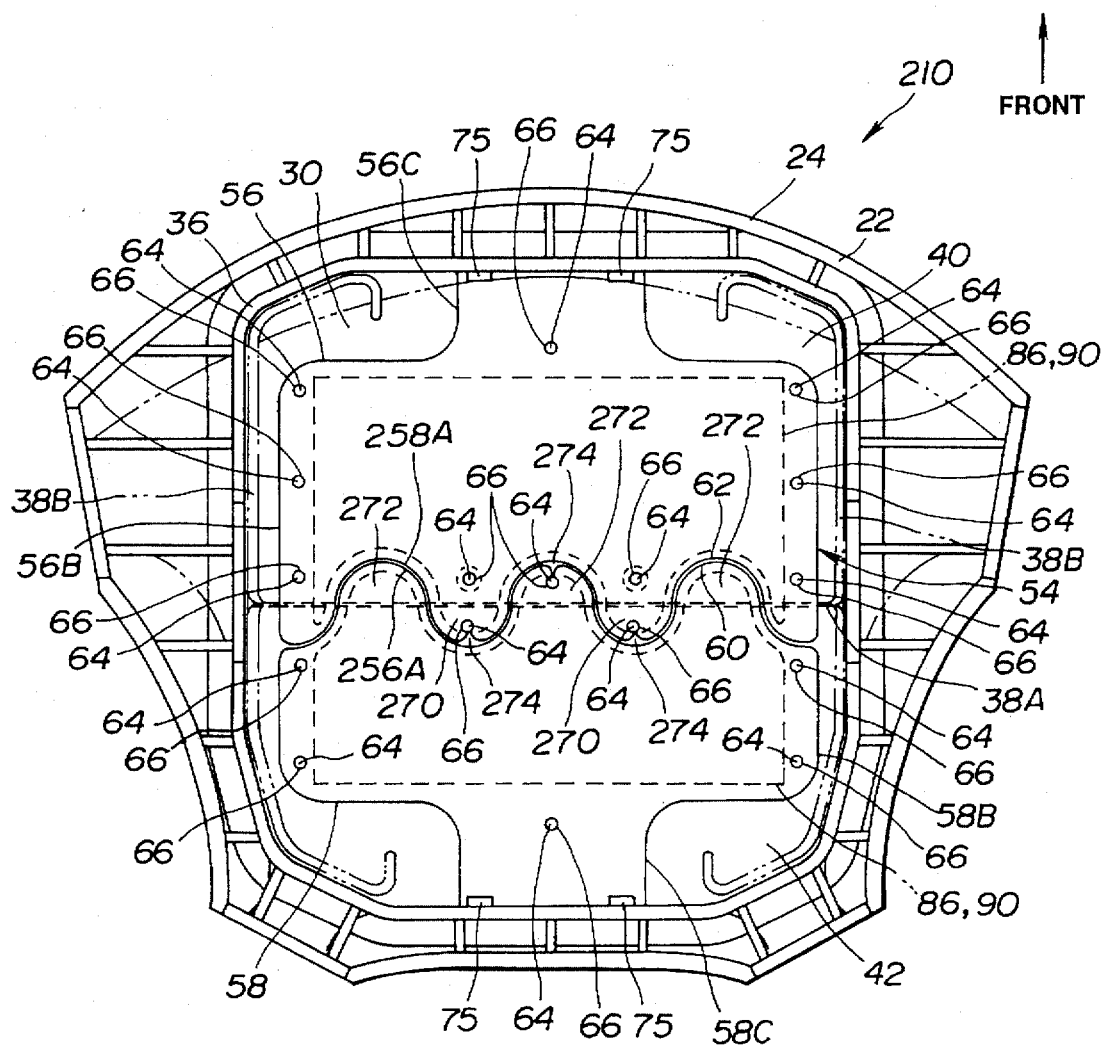
FIG. 7 is a bottom plan view of a third embodiment of the cover assembly.

Referring to FIG. 7, a driver's side airbag module cover assembly 210 of a third embodiment according to the present invention is now explained. The cover assembly 210 is similar to the cover assembly 10 of the first embodiment except outer perimeter portions 256A and 258A of the first and second membrane type switch halves 56 and 58. Like reference numerals denote like parts and therefore detailed explanations therefor are omitted. As illustrated in FIG. 7, the first and second membrane type switch halves 56 and 58 have outer perimeter portions 256A and 258A along which the mutually mated portions 60 and 62 extend are in the form of undulations, respectively. Specifically, the first and second membrane type switch halves 56 and 58 are provided with a plurality of projecting portions 270 and 272 extending across the central portion 38A of the easy-to-break line 38, respectively. The projecting portions 270 and 272 are alternately disposed along the central portion 38A of the easy-to-break line 38 and behind the front and rear portions 28A and 28B of the horn actuation area 28. Some or all of the projecting portions 270 and 272 have throughholes 66 engaging the mounting posts 64 of the cover 22, and grooves 274 extending from the throughholes 66 to the outer perimeter portions 256A and 258A.

Figure 8:
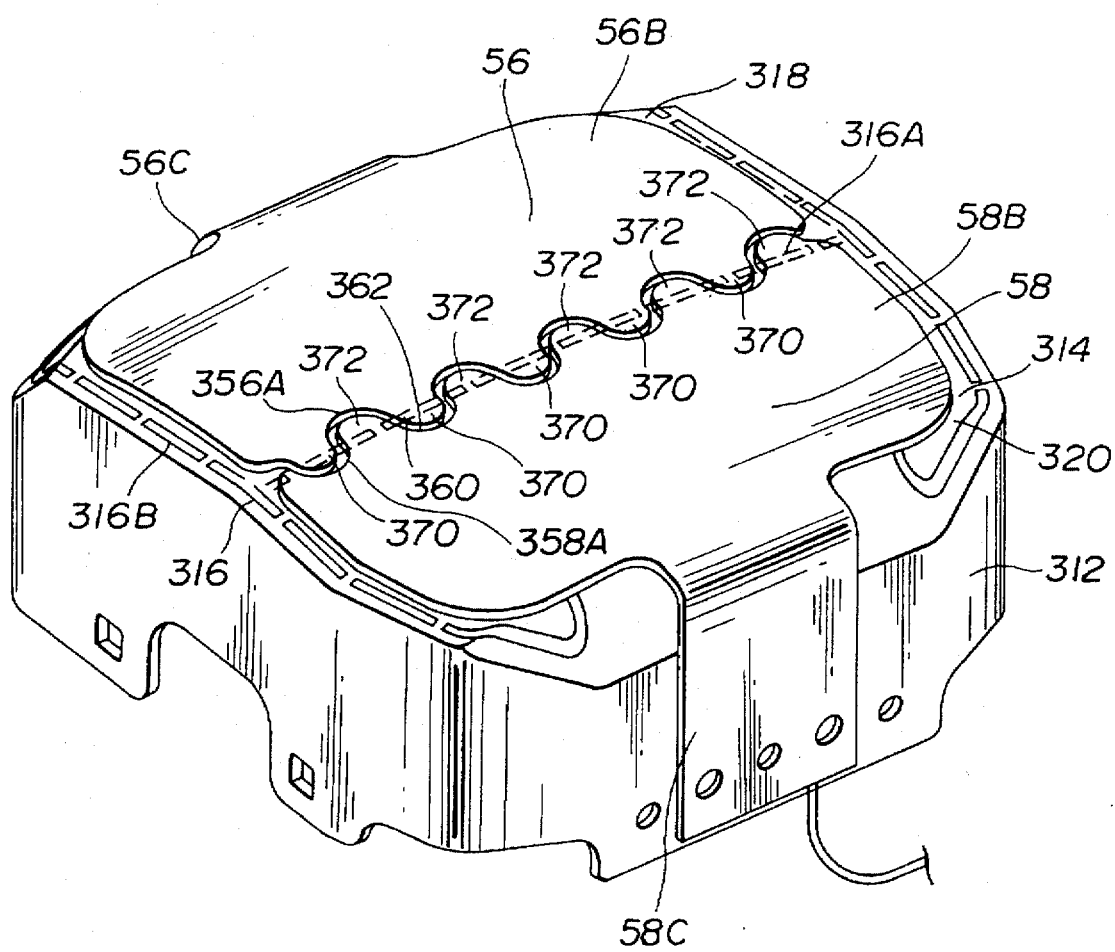
FIG. 8 is a perspective view of a fourth embodiment of the cover assembly, showing an inner cover to which the membrane type switch is attached.
Figure 9A:
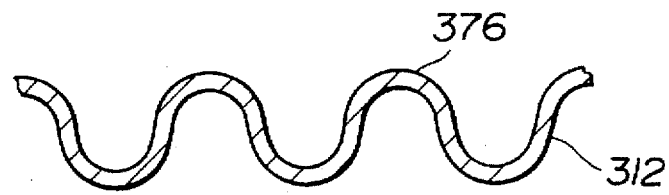
FIGS. 9A–9E are sections of modified inner covers.
Figure 9B:
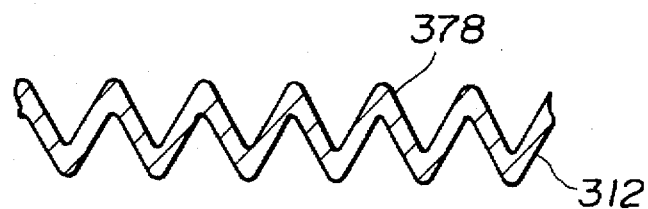
Figure 9C:
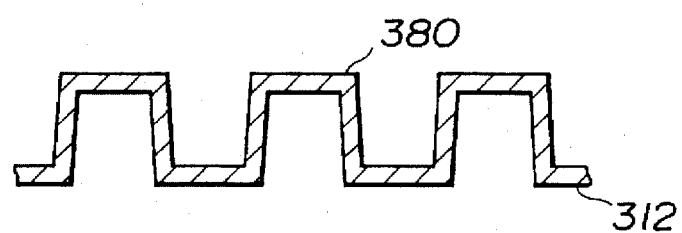
Figure 9D:
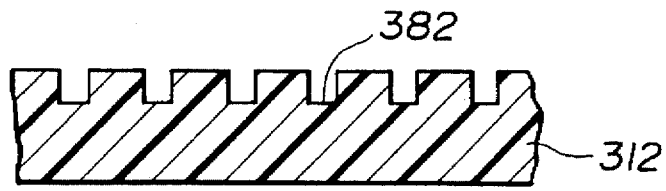
Figure 9E:
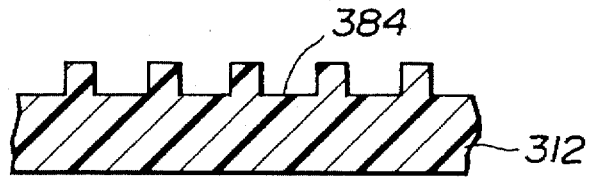

FIG. 8 shows a driver's airbag module cover assembly of a fourth embodiment according to the present invention, which is similar to the cover assembly 10 of the the first embodiment except that an airbag inner cover 312 is provided for interconnecting the mutually mated portions 60 and 62 of the first and second membrane type switch halves 56 and 58 of the membrane type switch 54. Like reference numerals denote like parts and therefore detailed explanations therefor are omitted. As illustrated in FIG. 8, the airbag inner cover 312 is formed of a generally rectangular box shape configured to be disposed between the cover 22 and the airbag module. The airbag inner cover 312 is made of a suitable synthetic resin such as polypropylene. The airbag inner cover 312 has an airbag projection area 314 positioned behind the horn actuation area 28 and formed with an easy-to-break line 316 extending at least through the airbag projection area 314. The easy-to-break line 316 is of a generally H shape similar to the easy-to-break line 38 of the flexible airbag module cover 22 and includes a central portion 316A and spaced traversing portions 316B connected with the central portions 316A. The easy-to-break line 316 defines two flap portions 318 and 320 forcibly separable from the airbag inner cover 312 along the easy-to-break line 318 upon deployment of the folded inflatable cushion. The first and second membrane type switch halves 56 and 58 are attached by a suitable method such as a bonding agent, adhesive tape, and the like to the airbag projection area 314 with mutually mated portions 360 and 362 positioned along the central portion 316A of the easy-to-break line 316. The airbag projection area 314 to which the first and second membrane type switch halves 56 and 58 are attached is adapted to be more rigid than the horn actuation area 28. Outer perimeter portions 356A and 358A along which the mutually mated portions 360 and 362 extend are in the form of undulations, respectively, like as the outer perimeter portions 256A and 258A of the third embodiment shown in FIG. 7. The first and second membrane type switch halves 56 and 58 have a plurality of projecting portions 370 and 372 extending across the central portion 316A of the easy-to-break line 316, respectively. The projecting portions 370 and 372 are alternately disposed along the central portion 316A of the easy-to-break line 316 and behind the front and rear portions 28A and 28B of the horn actuation area 28 of the cover 22. The airbag inner cover 312 serves for preventing a self-expanding or self-restoring force of the folded inflatable cushion disposed adjacent below the airbag inner cover 312, from urging the membrane type switch 54.

The airbag inner cover 312 can be provided with projections configured as illustrated in FIGS. 9A, 9B, 9C, 9D, or 9E, on an outer surface thereof to which the first and second membrane type switch halves 56 and 58 are attached. The projections may be provided by corrugation having a section such as arcuate shape 376 of FIG. 9A, sawtooth shape 378 of FIG. 9B, and channel shape 380 of FIG. 9C. The projections may be provided by forming narrower grooves 382 of FIG. 9D or wider grooves 384 of FIG. 9E on the outer surface of the airbag inner cover 312, respectively. The projections serve for increasing a performance of the membrane type switch 54.

Referring now to FIGS. 10–14, a driver's side airbag module cover assembly 410 of a fifth embodiment according to the present invention, is explained. The cover assembly 410 is similar to the cover assembly 10 of the aforementioned first embodiment except a modified membrane type switch 454 and a back panel 498 provided behind the membrane type switch 454. Like reference numerals denote like parts and therefore detailed explanations therefor are omitted.

Figure 11:
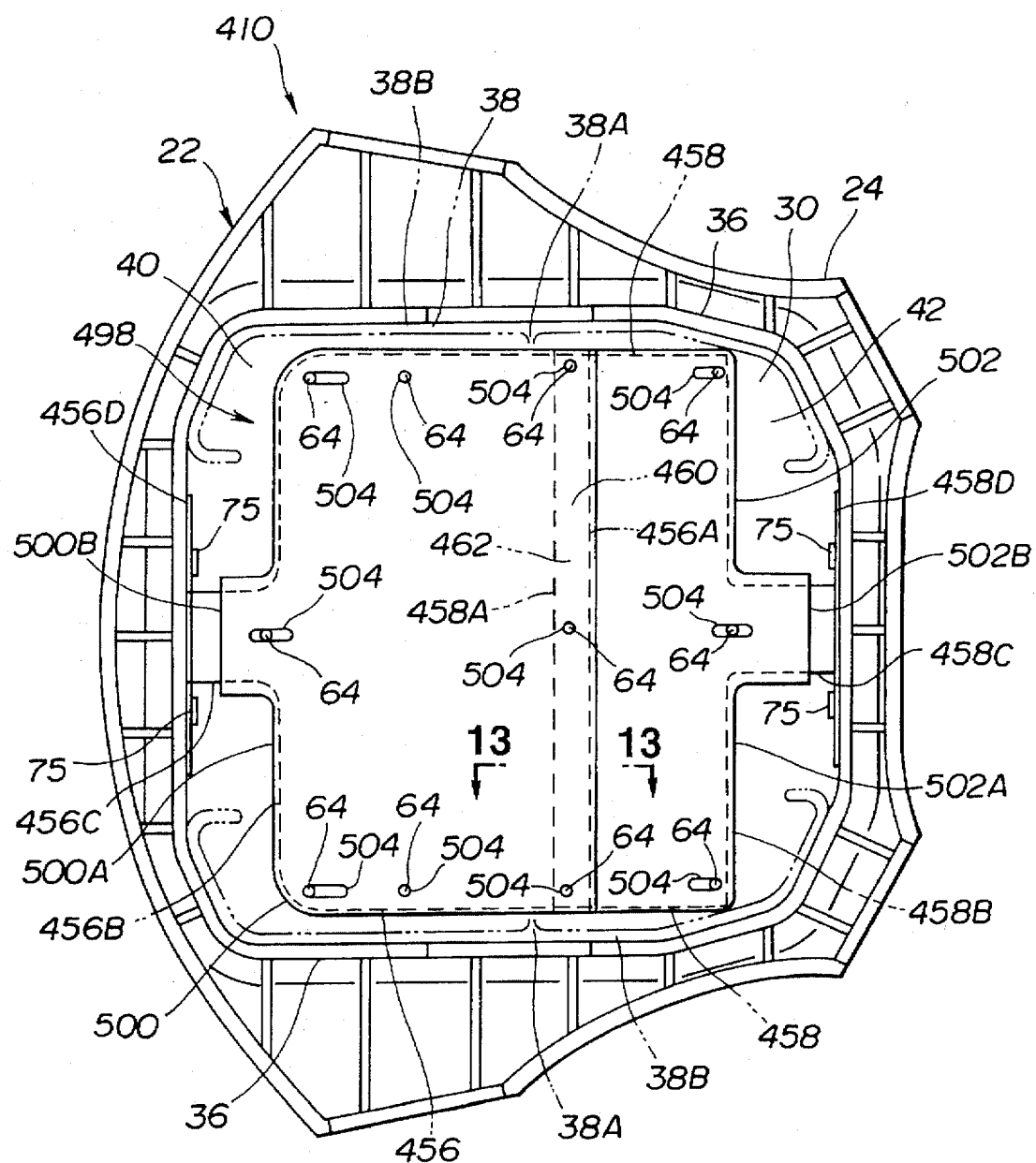
FIG. 11 is a bottom plan view of the cover assembly of FIG. 10.
Figure 12:
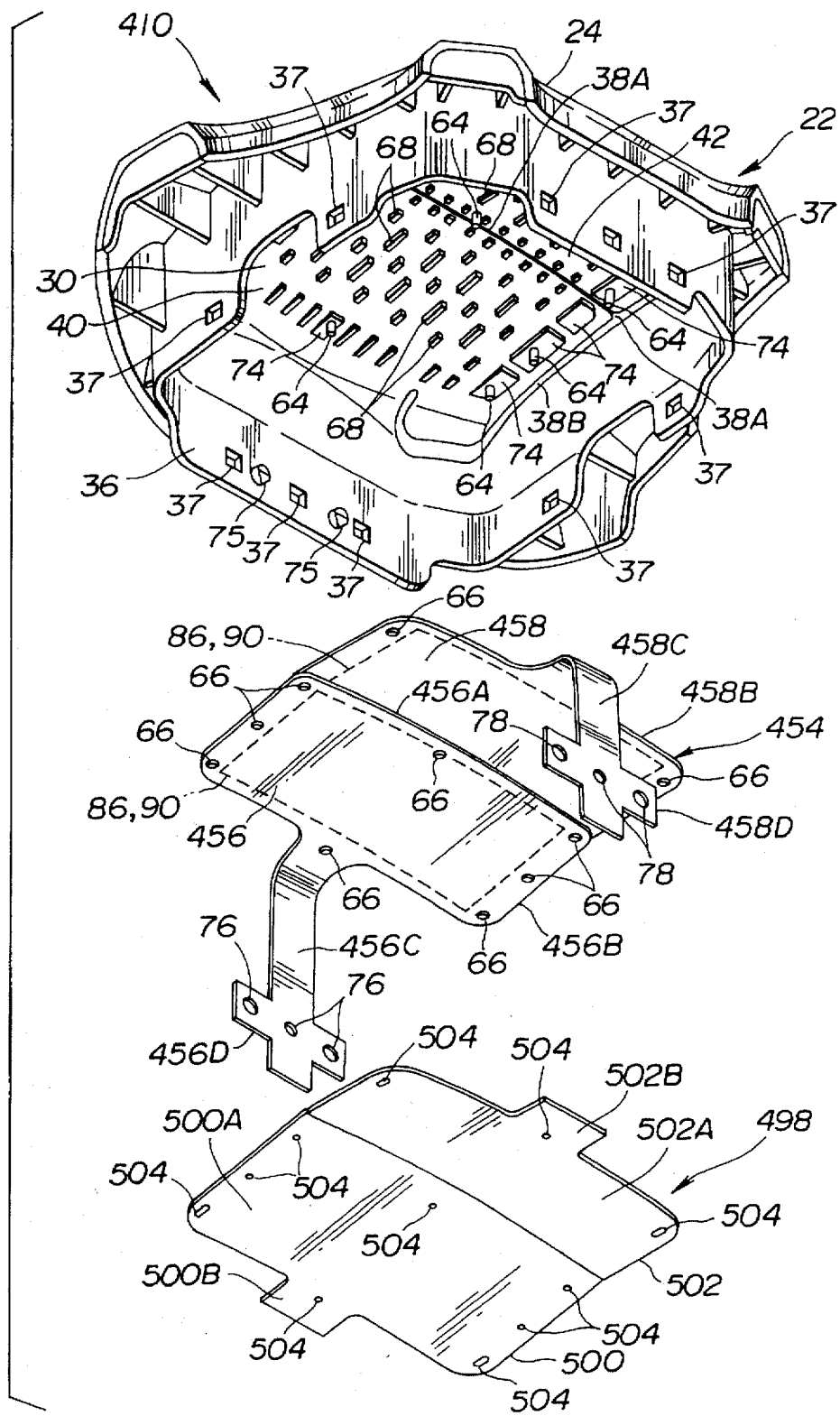
FIG. 12 is an exploded perspective view of the cover assembly of FIG. 10.

As illustrated in FIG. 11, the modified membrane type switch 454 differs from the membrane type switch 54 of the first embodiment in that a first membrane type switch half 456 extends behind the front portion 28A of the horn actuation area 28 across the central portion 38A of the easy-to-break line 38 and has an outer perimeter portion 456A located behind the rear portion 28B, and that a second membrane type switch half 458 is disposed behind the rear portion 28B of the horn actuation area 28 and has an outer perimeter portion 458A located behind the rear portion 28B. The first and second membrane type switch halves 456 and 458 have mutually mated portions 460 and 462 extending along the adjacent outer perimeter portions 458A and 456A thereof, respectively. The mutually mated portions 460 and 462 extend along the central portion 38A of the easy-to-break line 38 and overlap one on another. The first and second membrane type switch halves 456 and 458 each are composed of the same elements as described in the first embodiment. Further, as well as the aforementioned first embodiment, the first and second membrane type switch halves 456 and 458 have generally rectangular bodies 456B and 458B, tongues 456C and 458C extending from the bodies 456B and 458B along the side wall 38 of the cover 22, and terminal portions 456D and 458D, respectively.

The back panel 498 is mounted behind the membrane type switch 454 to provide a rigid pressure surface. The back panel 498 is mounted to the inner surface 30 of the flexible airbag module cover 22 through the membrane type switch 454. The back panel 498 is made of thermoplastic elastomer, for example, polyurethane, polyester, and the like. In this embodiment, the back panel 498 is made of the same synthetic resin material as the flexible airbag module cover 22. The back panel 498 is more rigid than the horn actuation area 28 of the flexible airbag module cover 22. The provision of the back panel 498 serves for improving an operating performance of the membrane type switch 454. The back panel 498 also serves for preventing a self-restoring force of the folded inflatable cushion disposed adjacent below the back panel 498, from urging the membrane type switch 454.

Specifically, the back panel 498 includes a front panel half 500 and a rear panel half 502 which are disposed substantially behind the first and second membrane type switch halves 456 and 458, respectively. The front and rear panel halves 500 and 502 are formed with generally rectangular bodies 500A and 502A having configuration similar to the bodies 456B and 458B of the first and second membrane type switch halves 456 and 458, and tongues 500B and 502B extending from the bodies 500A and 502A along the tongues 456C and 458C of the switch halves 456 and 458.

Reference numeral 504 denotes throughholes formed on the front and rear panel halves 500 and 502 for receiving the mounting posts 64 of the flexible airbag module cover 22. The front and rear panel halves 500 and 502 are attached to the cover 22 together with the first and second membrane type switch halves 456 and 458 by thermal staking as explained in the first embodiment.

Figure 13:
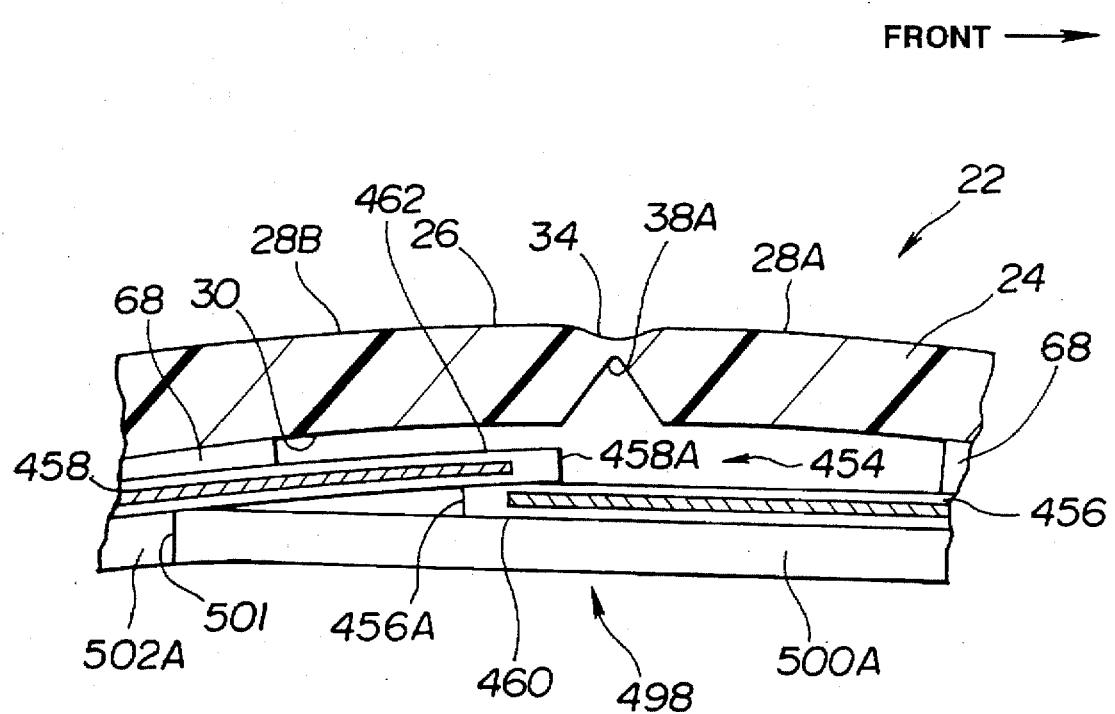
FIG. 13 is an enlarged fragmentary section taken along line 13—13 of FIG. 11.

As illustrated in FIG. 13, the body 500A of the front panel half 500 has a leading edge 501 extending beyond the outer perimeter portion 456A of the first membrane type switch half 456 which extends across the central portion 38A of the easy-to-break line 38. The rear panel half 502 has a leading edge mated with the leading edge 501 of the front panel half 500. The second membrane type switch half 458 extends beyond the leading edge of the rear panel half 502 and terminates at the outer perimeter portion 458A immediately before the central portion 38A of the easy-to-break line 38. Upon deployment of the folded inflatable cushion, the front and rear panel halves 500 and 502 of the back panel 498 are separable from each other as well as the first and second membrane type switch halves 456 and 458 and the flap portions 40 and 42 of the cover 22, permitting the smooth deployment of the folded inflatable cushion.

Figure 10:
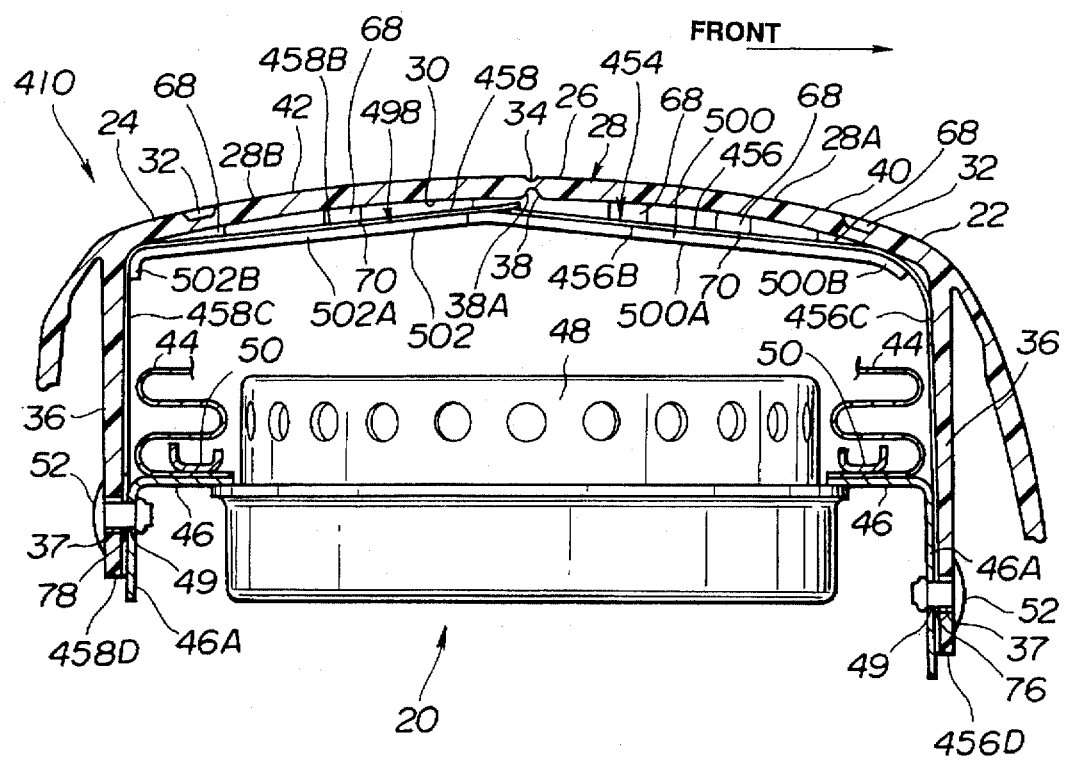
FIG. 10 is a section of a fifth embodiment of the cover assembly mounted to an airbag module, taken along line parallel to the line 4—4 of FIG 1.
Figure 14:
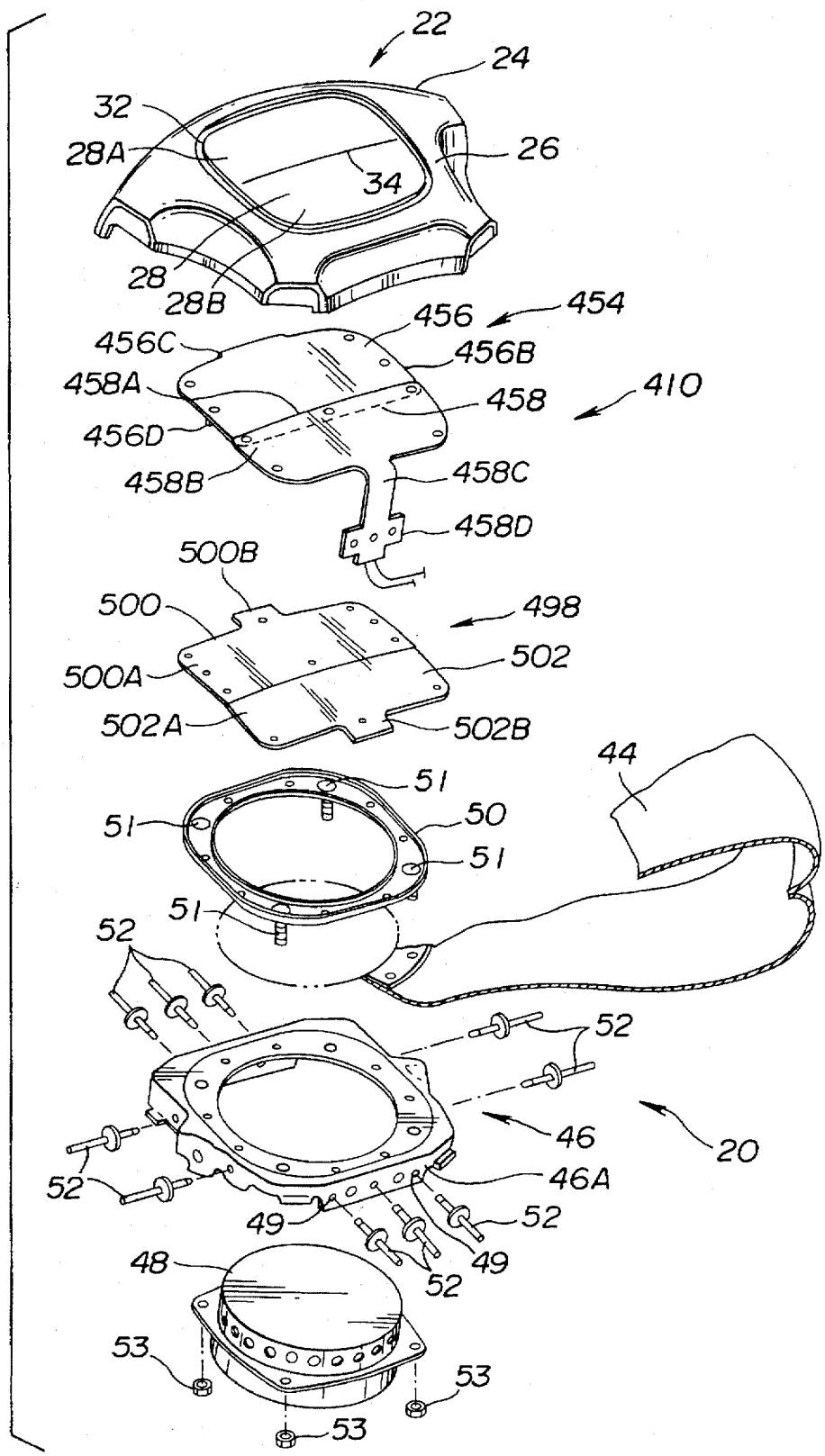
FIG. 14 is an exploded perspective view of FIG. 10.

As illustrated in FIGS. 10 and 14, the cover assembly 410 is mounted to a metal base plate 46 of the airbag module 20. A gas generator 48 and the folded inflatable cushion 44 are secured to the base plate 46 through a retainer 50 by means of fastening members such as bolts 51 and nuts 53 shown in FIG. 14. The cover assembly 410 is secured to a downward extending portion 46A of the base plate 46 by means of rivets 52, as shown in FIG. 10. Reference numeral 49 denotes holes formed in the downward extending portion 46A of the base plate 46 to receive the rivets 52. The first and second membrane type switch halves 456 and 458 attached to the inner surface 30 of the cover 22 are fixed to the base plate 46 in such as manner that the tongues 456D and 458D are interposed between the side wall 36 of the cover 22 and the downward extending portion 46A of the base plate 46.

Figure 15:
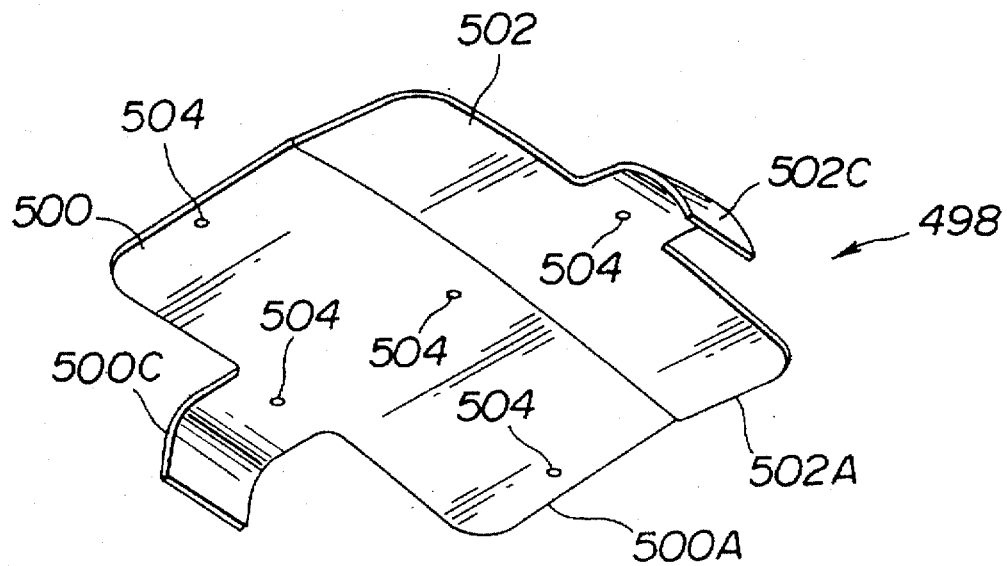
FIG. 15 is a perspective view of a modified back panel used in the cover assembly of FIG. 10.

The tongues of the front and rear panel halves 500 and 502 of the back panel 498 can be formed as curved tongues 500C and 502C shown in FIG. 15, which extend downward along being portions of the tongues 456C and 458C of the first and second membrane type switch halves 456 and 458, respectively.

Figure 16:
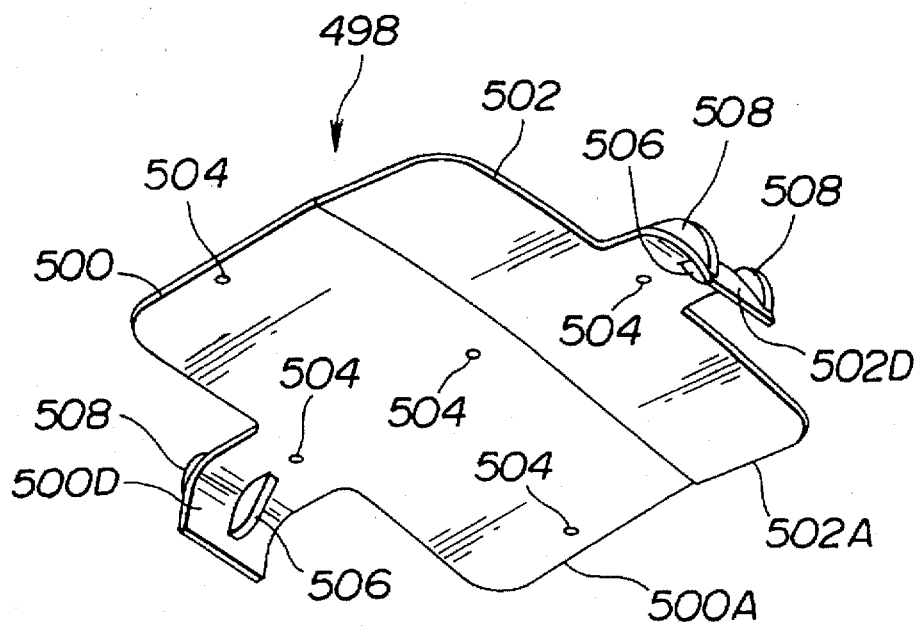
FIG. 16 is a view similar to FIG. 15, showing a further modified back panel.

Further, the front and rear panel halves 500 and 502 of the back panel 498 can be provided with curved tongues 500D and 502D shown in FIG. 16. The curved tongues 500D and 502D are similar to the tongues 500C and 502C of FIG. 15 but each of the curved tongues 500D and 502D has one projection 506 on an inner surface thereof and two spaced projections 508 parallel to each other on an outer surface thereof. The spaced projections 508 act as guides for the tongues 456C and 458C of the first and second membrane type switch halves 456 and 458, serving for ready positioning of the tongues 456C and 458C upon assembly.

These curved tongues 500C, 502C, 500D, and 502D protect the bending portions of the tongues 456C and 458C of the switch halves 456 and 458 from concentration of stress caused by a self-restoring force of the folded inflatable cushion. This serves for preventing the switch halves 456 and 458 from trouble or damage caused by the stress transmitted via the tongues 456C and 458C thereof.

Figure 17:
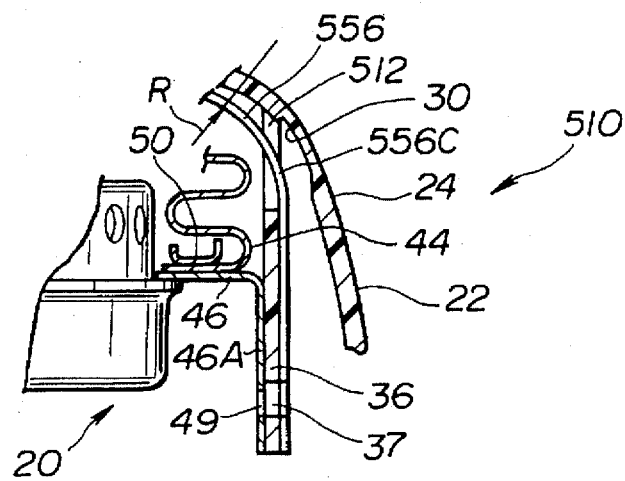
FIG. 17 is an enlarged fragmentary section of a sixth embodiment of the cover assembly, taken along line parallel to the line 4—4 of FIG. 1.
Figure 18:
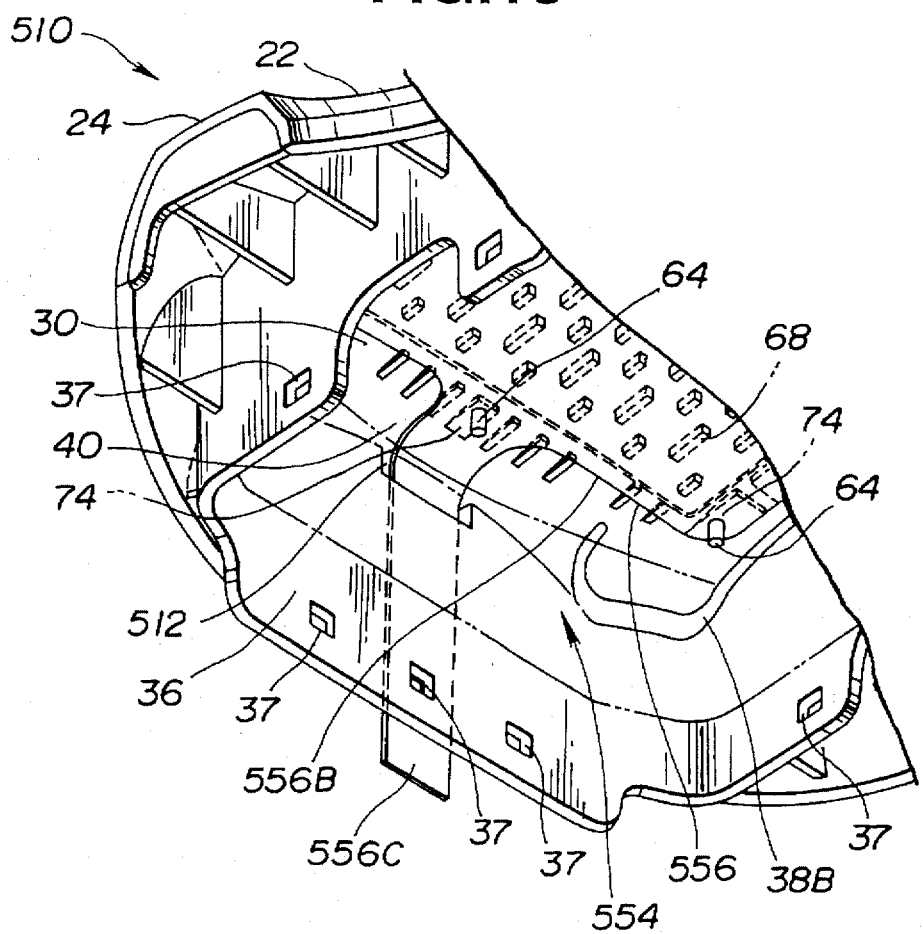
FIG. 18 is a fragmentary perspective view of the cover assembly of FIG. 17.

Referring now to FIGS. 17 and 18, a driver's side airbag module cover assembly 510 of a switch embodiment according to the present invention, will be explained. The cover assembly 510 is similar to the cover assembly 10 of the aforementioned first embodiment. Like reference numerals denote like parts. As seen from FIGS. 17 and 18, the cover assembly 510 includes a membrane type switch 554 mounted to the inner surface 30. The membrane type switch 554 comprises a pair of membrane type switch halves disposed behind the horn actuation area of the cover 22, one of which is indicated at 556 in FIG. 17. Each of the membrane type switch halves is composed of the same elements as explained in the first embodiment. The membrane type switch halves have bodies and tongues extending from the bodies, respectively. A tongue 556C extending from a body 556B of the membrane type switch half 556 passes through a window 512 formed in the side wall 36 of the flexible airbag module cover 22.

The window 512 having an elongated rectangular shape is provided at an upper end portion of the side wall 36 at which the side wall 36 is coupled with the upper wall 24 of the cover 22. The tongue 556C of the membrane type switch half 556 of the membrane type switch 554 arcuately bends near the corner where the side wall 36 and the upper wall 24 encounter with each other. The window 512 receives the tongue 556C to pass therethrough such that the tongue 556C extends along an outside surface of the side wall 36. Thus, the tongue 556C has a greater bend radius R at the bending portion as shown in FIG. 17. The tongue 556C is secured to the base plate 46 of the airbag module 20 together with the side wall 36 of the cover 22 by means of a rivet (not shown). The window 512 serves for preventing the stress caused by a self-restoring force of the folded inflatable cushion 44 from concentrating on the bending portion of the tongue 556C. The side wall 36 is also provided with a window for receiving the tongue of the other membrane type switch half.

Figure 19:
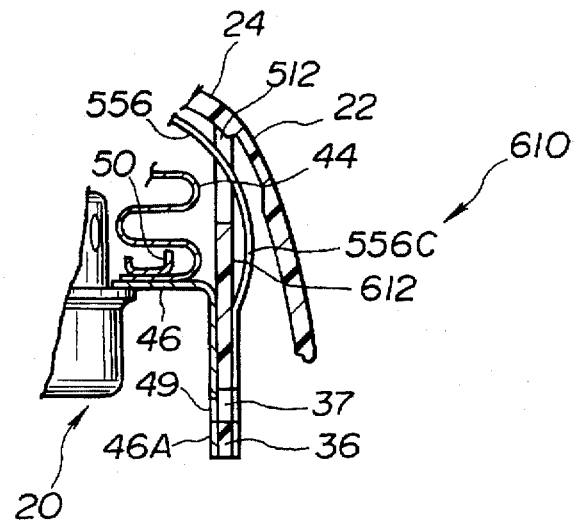
FIG. 19 is a view similar to FIG. 17 but showing a seventh embodiment of the cover assembly of FIG. 17.

FIG. 19 shows a driver's airbag module cover assembly 610 of a seventh embodiment according to the invention, which differs from the sixth embodiment of FIGS. 17 and 18 in that the tongue 556C is arranged such that a clearance 612 is provided between the side wall 36 and the tongue 556C passing through the window 512.

As illustrated in FIG. 19, the tongue 556C of the membrane type switch half 556 extends outward through the window 512 and arcuately curves such that the clearance 612 is provided between the side wall 36 and the curving portion of the tongue 556C. In addition to effects explained in the sixth embodiment, this arrangement serves for reducing a tensile stress exerted on the mounting portion of the tongue 556C secured to the base plate 46 when the folded inflatable cushion 44 deploys.

Figure 20:
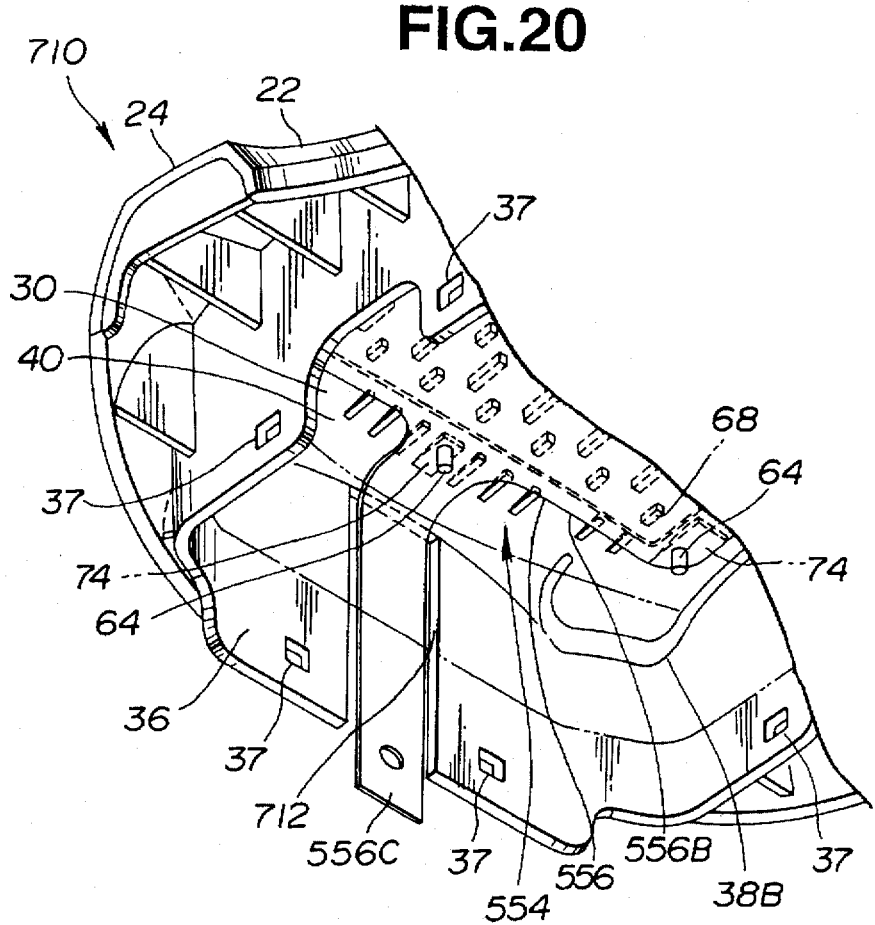
FIG. 20 is a view similar to FIG. 18 but showing an eighth embodiment of the cover assembly.

Referring to FIG. 20 a driver's airbag module cover assembly 710 of an eighth embodiment according to the invention is now explained. The cover assembly 710 differs from the cover assembly 510 of the sixth embodiment of FIGS. 17 and 18 in that the side wall 36 is provided with a cutout 712 for receiving the tongue 556C of the membrane type switch half 556.

As illustrated in FIG. 20, the cutout 712 extends to a distal end edge of the side wall 36. The tongue 556C of the membrane type switch half 556 bends near the corner where the upper wall 24 and the side wall 36 of the cover 22 encounter with each other, and is received in the cutout 712. The bending portion of the tongue 556C is prevented from concentration of the stress caused by a self-restoring force of the folded inflatable cushion 44.

Figure 21:
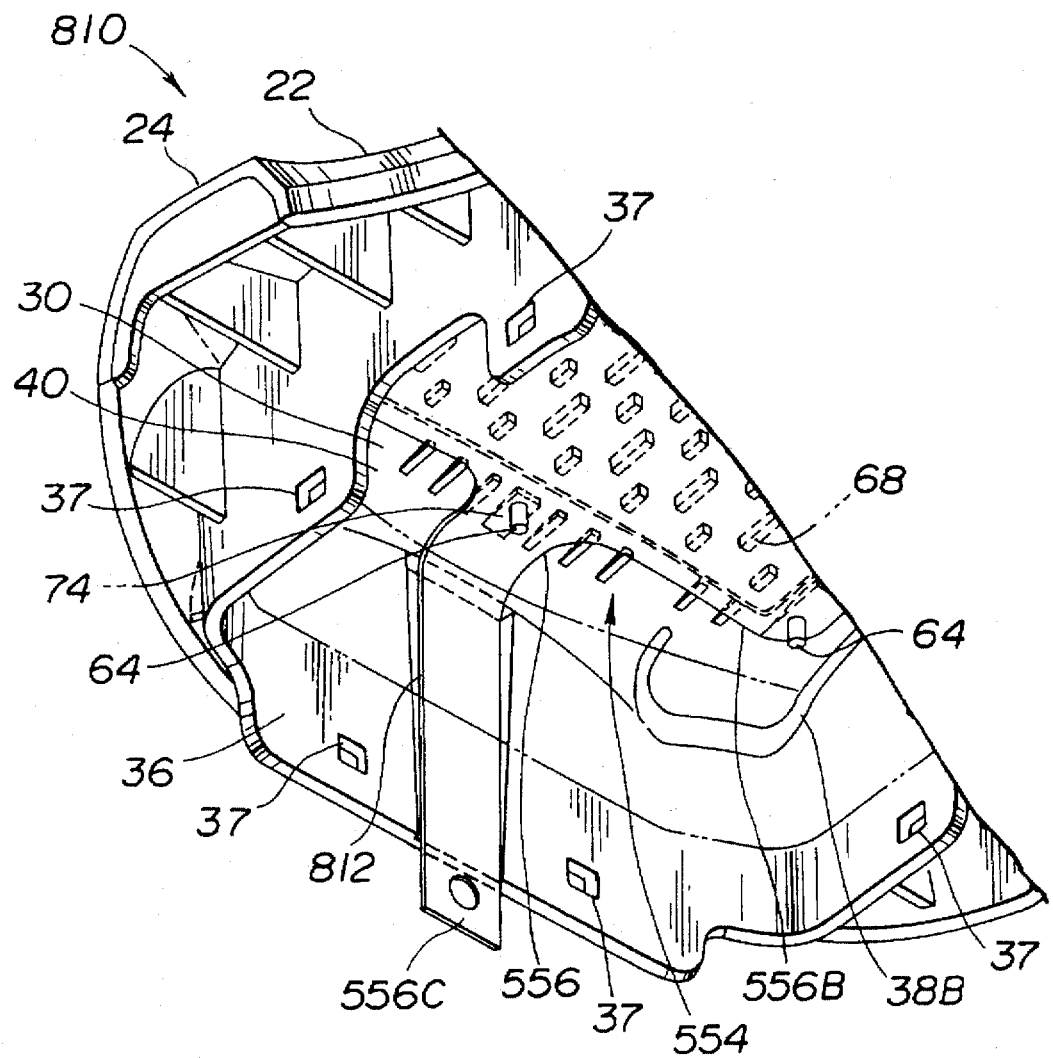
FIG. 21 is a view similar to FIG. 18 but showing a ninth embodiment of the cover assembly.

FIG. 21 shows a driver's airbag module cover assembly 810 of a ninth embodiment according to the invention. The cover assembly 810 is similar to the cover assembly 510 of the sixth embodiment of FIGS. 17 and 18 except that the side wall 36 is provided with a recess 812 for receiving the tongue 556C of the membrane type switch half 556. Like reference numerals denote like parts.

As illustrated in FIG. 21, the recess 812 is formed on an inside surface of the side wall 36 and extends downward to a distal end of the side wall 36. The tongue 556C of the membrane type switch half 556 bends near the corner where the upper wall 24 and the side wall 36 encounter with each other, and is received in the recess 812. As well as the window 512 in the sixth embodiment, the recess 812 serves for protecting the bending portion of the tongue 556C from concentration of the stress caused by a self-restoring force of the folded inflatable cushion 44.

Although a pair of membrane type switch halves are used in the embodiments as described above, the present invention is not limited to these embodiments and one membrane type switch extending across the easy-to-break line of the flexible airbag module cover may be used.

What is claimed is:

1. A driver's side airbag module cover assembly comprising:

a flexible airbag module cover having an outer surface with a horn actuation area, an inner surface, and an easy-to-break line extending at least across said horn actuation area;

a first membrane type switch half and a second membrane type switch half mounted behind said horn actuation area and behind said easy-to-break line, said first and second membrane type switch halves having outer perimeters and mutually mated portions extending along adjacent segments of said outer perimeters, said adjacent segments of said outer perimeters being undulated, said mutually mated portions being positioned adjacent said easy-to-break line; and at least one interconnecting member adapted to interconnect said mutually mated portions, said at least one interconnecting member including an airbag inner cover having an airbag projection area positioned behind said horn actuation area and formed with an easy-to-break line extending at least across said airbag projection area, said at least one interconnecting member including an attachment element adapted to attach said first and second membrane type switch halves to said airbag projection area with said mutually mated portions positioned along said easy-to-break line.

2. A driver's side airbag module cover assembly as claimed in claim 1, wherein said airbag inner cover has an outer surface and projections on said outer surface, said projections being located where said first and second membrane type switch halves are attached to said airbag inner cover.

3. A driver's side airbag module cover assembly comprising:

a flexible airbag module cover having an outer surface with a horn actuation area, an inner surface, and an easy-to-break line extending at least across said horn actuation area;

a first membrane type switch half and a second membrane type switch half mounted behind said horn actuation area and behind said easy-to-break line, said first and second membrane type switch halves having outer perimeters and mutually mated portions extending along adjacent segments of said outer perimeters, said mutually mated portions being positioned adjacent said easy-to-break line, said mutually mated portions overlapping one another; and at least one interconnecting member adapted to interconnect said mutually mated portions, said at least one interconnecting member including an attachment element adapted to attach said mutually mated portions to each other at an area where said mutually mated portions overlap one another.

4. A driver's side airbag module cover assembly as claimed in claim 3, further comprising:

mounting members adapted to mount said first and second membrane type switch halves along said outer perimeters thereof to said inner surface of said airbag module cover.

5. A driver's side airbag module cover assembly as claimed in claim 4, wherein said flexible airbag module cover has a plurality of ribs extending from said inner surface toward said first and second membrane type switch halves.

6. A driver's side airbag module cover assembly as claimed in claim 5, wherein said plurality of ribs have edges cooperating with each other to define a generally part cylindrical imaginary surface.

7. A driver's side airbag module cover assembly as claimed in claim 6, wherein said first and second membrane type switch halves extend along said edges of said plurality of ribs.

8. A driver's side airbag module cover assembly as claimed in claim 7, wherein said adjacent segments of said outer perimeters of said mutually mated portions are line segments.

9. A driver's side airbag module cover assembly as claimed in claim 7, wherein said adjacent segments of said outer perimeters of said mutually mated portions are undulations.

10. A driver's side airbag module cover assembly, comprising:

a flexible airbag module cover having an outer surface with a horn actuation area, an inner surface, and an easy-to-break line extending at least across said horn actuation area; and a membrane type switch mounted behind said horn actuation area and behind said easy-to-break line, said membrane type switch extending across said easy-to-break line.

11. A driver's side airbag module cover assembly, as claimed in claim 10, wherein said membrane type switch comprises:

a first membrane type switch half and a second membrane type switch half mounted behind said horn actuation area and behind said easy-to-break line;

said first and second membrane type switch halves having outer perimeters and mutually mated portions extending along adjacent segments of said outer perimeters, said mutually mated portions being positioned adjacent said easy-to-break line; and at least one interconnecting member adapted to interconnect to said mutually mated portions.

12. A driver's side airbag module cover assembly as claimed in claim 11, wherein said at least one interconnecting member includes an airbag inner cover having an airbag projection area positioned behind said horn actuation area and formed with an easy-to-break line extending at least across said airbag projection area, and said at least one interconnecting member includes an attachment element adapted to attach said first and second membrane type switch halves to said airbag projection area so that said mutually mated portions are positioned along said easy-to-break line extending at least across said airbag projection area.

13. A driver's side airbag module cover assembly as claimed in claim 11, further comprising:

a back panel mounted behind said membrane type switch to provide a rigid pressure surface.

14. A driver's side airbag module cover assembly as claimed in claim 13, wherein said back panel is more rigid than said horn actuation area of said flexible airbag module cover.

15. A driver's side airbag module cover assembly as claimed in claim 14, wherein said back panel is mounted to said inner surface of said flexible airbag module cover.

16. A driver's side airbag module cover assembly as claimed in claim 15, wherein said back panel and said flexible airbag module cover are comprised of the same synthetic resin.

17. A driver's side airbag module cover assembly as claimed in claim 16, wherein said flexible airbag module cover includes a mounting structure, said mounting structure including a wall extending from said inner surface and surrounding an area on said inner surface comprising to said horn actuation area.

18. A driver's side airbag module cover assembly as claimed in claim 17, wherein said membrane type switch has a tongue.

19. A driver's side airbag module cover assembly as claimed in claim 18, wherein said wall has a receiving member adapted to receive said tongue in such a manner as to prevent concentration of stress on said tongue.

20. A driver's side airbag module cover assembly as claimed in claim 19, wherein said receiving member comprises a window formed in said wall to permit said tongue to pass therethrough.

21. A driver's side airbag module cover assembly as claimed in claim 19, wherein said receiving member comprises a recess formed in said wall.

22. A driver's side airbag module cover assembly as claimed in claim 19, wherein said receiving member comprises a cutout extending to a distal end edge of said wall.

23. A driver's side airbag module cover assembly, comprising:

a flexible airbag module cover having an outer surface with a horn actuation area and an inner surface; and a membrane type switch mounted behind said horn actuation area and having a tongue;

said flexible airbag module cover including a mounting structure, said mounting structure including a wall extending from said inner surface and surrounding an area on said inner surface corresponding to said horn actuation area, said wall having a receiving member adapted to receive said tongue in such a manner as to prevent concentration of stress on said tongue.

24. A driver's side airbag module cover assembly as claimed in claim 23, wherein said receiving member comprises a window formed in said wall to permit said tongue to pass therethrough.

25. A driver's side airbag module cover assembly as claimed in claim 23, wherein said receiving member comprises a recess formed in said wall.

26. A driver's side airbag module cover assembly as claimed in claim 23, wherein said receiving member comprises a cutout extending to a distal end edge of said wall.

\* \* \* \* \*